J. BIERSCHENK.
BALL BEARING.
APPLICATION FILED OCT. 27, 1905.
1,023,614.
Patented Apr. 16, 1912.
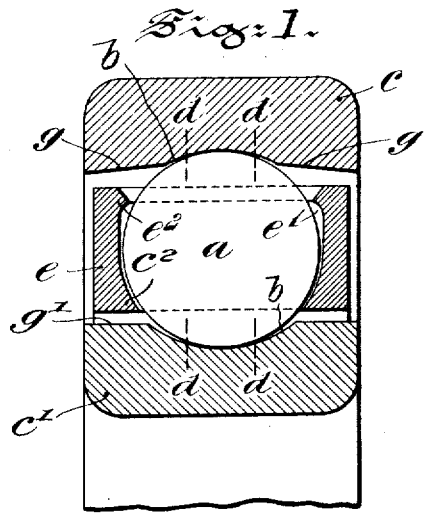
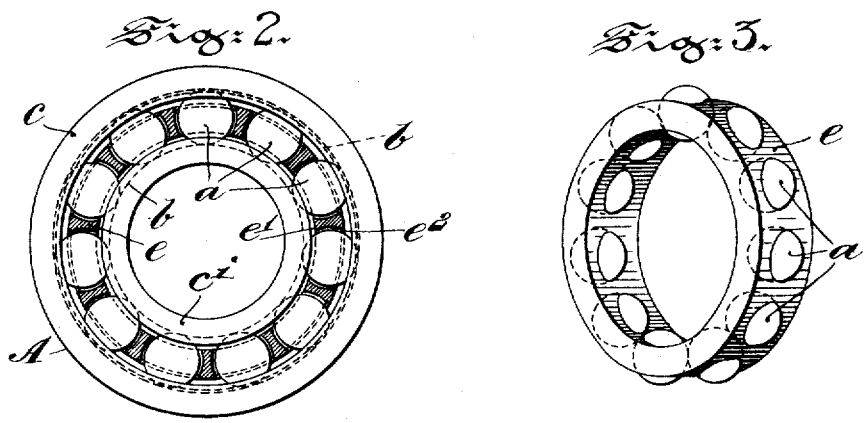
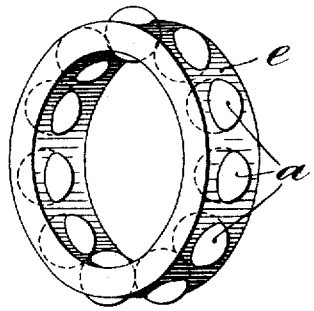
WITNESSES:
Wilhelm Vogt
Thomas M. Smith
INVENTOR
Joseph Bierschenk,
BY
J. Walter Douglas
ATTORNEY.

UNITED STATES PATENT OFFICE.

JOSEPH BIERSCHENK, OF IVRY PORT, FRANCE.

BALL-BEARING.

1,023,614.  Specification of Letters Patent.  Patented Apr. 16, 1912.

Application filed October 27, 1905. Serial No. 284,614.

*To all whom it may concern:*

Be it known that I, JOSEPH BIERSCHENK, a subject of the German Empire, residing at Ivry Port, Seine, France, have invented certain new and useful Improvements in Ball-Bearings, of which the following is a specification.

My invention has relation to a ball bearing; and in such connection it relates to the particular arrangement of the raceways for balls formed in contiguous faces of two concentric members or rings and to means and the manner of inserting and retaining the balls in the same.

The principal objects of my invention are first, to provide a ball bearing formed of two concentric members or rings at their contiguous faces with raceways varying in depth and width and adapted to receive and retain balls introduced into the same; second, to provide the inner face of the outer member with inclined portions terminating in the raceway, whereof the inclined portions enable the introduction of the balls into the raceways of the members; and third, to provide a ball-bearing with a retainer for the balls arranged to facilitate introducing the same between the rings and for holding the balls apart therein.

The nature and scope of my present invention will be more fully understood from the following description taken in connection with the accompanying drawings forming part hereof, in which—

Figure 1, is a view illustrating in cross-section downwardly inclined portions terminating in a centrally arranged raceway in the inner face of the outer member, a ball partly engaging raceways of both members and a retainer or ring partly surrounding the ball. Fig. 2, is a view, reduced, illustrating partly in side elevation and partly in section, the ball bearing and the retainer for the balls interposed between the rings forming the same; and Fig. 3, is a detail view, illustrating perspectively, the retainer and balls projecting therefrom.

Referring to the drawings, $a$ represents the balls or spherical bodies preferably formed of steel, which are interposed between the annular members or rings $c$ and $c^1$, forming in conjunction with the balls a ball-bearing A. The balls $a$, are held in position between the rings $c$ and $c^1$, solely by engaging raceways $b$, arranged centrally in contiguous faces of the same, which raceways are preferably shallow to offer only a portion of their surface, as bearings for the balls $a$. The depth of the raceways $b$, is chosen in a certain relation to the elasticity of the material of the rings $c$ and $c^1$, and balls $a$, to permit of the introduction of the balls $a$, between the members $c$ and $c^1$, by springing the same successively sidewise into the raceways $b$, of the rings $c$ and $c^1$. The balls $a$, during the introduction, are held in the raceway $b$, of the inner member, by a retainer $e$, remaining in engagement with the balls after the same have been inserted between the rings. The raised portions $g$ and $g^1$, inclosing the raceways $b$, form when the members occupy their proper position with respect to each other an annular space, which is less in width than the diameter of the balls, so that the balls can only be inserted into the raceways $b$, by the elastic deformation of both members. However, as the balls $a$, are already placed in the raceway $b$, of the inner member $c^1$ the balls $a$, have only to pass over one of the raised portions of the outer member, which may be inclined toward the raceway $b$. Thus the balls when resting in the raceway of the inner member $c^1$, are only slightly greater in diameter than the distance from the deepest portion of the raceway $b$, of the inner member to the edges of the raceway $b$, of the outer member. Moreover, as the balls are successively, sprung into the raceways the necessary elastic deformation of both members to spring the balls $a$, into the raceway of the outer member is comparatively slight; and therefore, the members may be comparatively thick in cross-section.

When the balls $a$, are held in position in the raceway $b$, of the inner member by a retainer of a type which is as shown in Figs. 2 and 3, the bearing A, may be assembled, by first springing two diametric oppositely arranged balls $a$, resting in the raceway of the inner member by elastic deformation of both members into the raceway of the outer member, the rings during this operation being at right angles to each other and then swinging the inner member upon the introduced balls, as fulcral points sidewise into a concentric position, with respect to the outer member, thus springing by elastic deformation of both members the balls of the inner member at each side of the fulcrul balls, successively into the raceway of the outer member. The bearing may also be assembled by first inserting the lowermost ball of those of the inner member $e^1$, into the raceway of the outer member $c$, and then swinging the inner member $c^1$, upon the inserted ball, as a support into a concentric position with respect to the outer member $c$, in which instance the balls on each side of the first inserted ball are likewise successively sprung into the raceway of the outer member. The introduction of the balls when held apart by a retainer $e$, does not differ from the introduction of the balls which abut against each other, and from which the temporary retainer is removed after assembling the bearing. The retainer $e$, is provided with radially arranged openings or chambers $e^1$, which after the balls have been inserted are contracted at one end by forming an annular projection or rib $e^2$, which in conjunction with the contracted portion $c^2$, of the chamber $e^1$, prevents the exit of the balls from their respective chambers, as will be readily understood from Fig. 1. The chamber $e^1$, formed in the retainer $e$, affords a free movement of the balls therein and the width in cross-section of the retainer is such as to permit of the introduction of the balls first into the deeper raceway of the inner ring, and then into the shallow race of the outer ring, without being brought into contact with the rings. The raceways $b$, of the members $c$ and $c^1$, are wider in cross-section than required for the balls $a$, which contact only with the portion indicated by $d, d$, in Fig. 1, of the drawings.

Having thus described the nature and objects of my invention, what I claim as new and desire to secure by Letters Patent is:—

A ball bearing comprising two members concentrically arranged with respect to each other and having grooves in their adjacent faces, the depth and width of the groove in one of said rings being greater than that of the other of the said rings, the space between the adjacent faces of the rings adjacent the grooves being slightly less than the diameter of the balls, balls occupying the said raceway, and a ball-holding annulus having a radial depth less than the space between said adjacent ring faces and provided with pockets into which the balls are placed prior to the assembling of the bearing parts and having opposite openings through which the balls project to engage the grooves, the outer walls of the openings having an inwardly directed ball-retaining flange.

In testimony whereof, I have hereunto set my signature in the presence of two subscribing witnesses.

JOSEPH BIERSCHENK.

Witnesses:
HANSON C. COXE,
RICHARD MOREAU.